United States Patent
Li

(10) Patent No.: US 11,349,972 B2
(45) Date of Patent: May 31, 2022

(54) MOBILE PHONE AND SLAVE MACHINE

(71) Applicant: GUANGDONG OPPO MOBILE TELECOMMUNICATIONS CORP., LTD., Guangdong (CN)

(72) Inventor: Jie Li, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 0 days.

(21) Appl. No.: 16/725,873

(22) Filed: Dec. 23, 2019

(65) Prior Publication Data

US 2020/0213432 A1 Jul. 2, 2020

(30) Foreign Application Priority Data

Dec. 29, 2018 (CN) .......................... 201822277606.6

(51) Int. Cl.
*H04M 1/02* (2006.01)

(52) U.S. Cl.
CPC ....... *H04M 1/0256* (2013.01); *H04M 1/0262* (2013.01); *H04M 1/0264* (2013.01);
(Continued)

(58) Field of Classification Search
CPC ............. H04M 1/0256; H04M 1/0262; H04M 1/0264; H04M 1/0266; H04M 1/0274;
(Continued)

(56) References Cited

U.S. PATENT DOCUMENTS

2017/0032164 A1* 2/2017 Liu ...................... G06F 3/0416
2019/0213164 A1* 7/2019 Kwon ....................... G06F 1/08
(Continued)

FOREIGN PATENT DOCUMENTS

CN 201830329 U 5/2011
CN 202856839 U 4/2013
(Continued)

OTHER PUBLICATIONS

Extended EP Search Report for EP Application No. 19213458.3 dated May 8, 2020.
(Continued)

*Primary Examiner* — Eugene Yun
(74) *Attorney, Agent, or Firm* — Young Basile Hanlon & MacFarlane, P.C.

(57) ABSTRACT

A mobile phone includes a master machine and a slave machine. The master machine includes a first power source unit; the slave machine includes a second power source unit, a display screen, a main board and a fingerprint identification assembly. The slave machine is able to be mounted to the master machine and detached from the master machine. When the slave machine is detached from the master machine, the slave machine is able to be in communication connection with the master machine. The main board is provided with a first through hole, the fingerprint identification assembly includes a connecting circuit board and an identification unit, the identification unit is able to be in communication connection with the main board through the connecting circuit board, and the identification unit is inserted into the first through hole. The present application further provides a slave machine.

16 Claims, 15 Drawing Sheets

(52) U.S. Cl.
  CPC ....... *H04M 1/0266* (2013.01); *H04M 1/0274* (2013.01); *H04M 1/0277* (2013.01)
(58) Field of Classification Search
  CPC .. H04M 1/0277; G06F 1/1632; G06F 1/1626; G06F 1/1647
  USPC .................................................. 455/566, 557
  See application file for complete search history.

(56) References Cited

U.S. PATENT DOCUMENTS

2019/0267434 A1* 8/2019 Liu ........................ G06F 1/1637
2020/0212156 A1* 7/2020 Gu ...................... H01L 27/3265

FOREIGN PATENT DOCUMENTS

| | | |
|---|---|---|
| CN | 203406909 U | 1/2014 |
| CN | 204156927 U | 2/2015 |
| CN | 105791464 A | 7/2016 |
| CN | 207458073 U | 6/2018 |
| CN | 108512958 A | 9/2018 |
| CN | 208126246 U | 11/2018 |
| EP | 2674831 A2 | 12/2013 |
| EP | 2975489 A1 | 1/2016 |
| EP | 3018888 A1 | 5/2016 |
| WO | 2018038288 A1 | 3/2018 |

OTHER PUBLICATIONS

International Search Report and Written Opinion for International Application No. PCT/CN2019/119841 dated Feb. 6, 2020.
India Office Action for IN Application 201914046772 dated Mar. 11, 2021.

* cited by examiner

MOBILE PHONE AND SLAVE MACHINE

CROSS-REFERENCE TO RELATED APPLICATION(S)

This application claims priority to and benefits of Chinese Patent Application Serial No. 201822277606.6, filed on Dec. 29, 2018, the entire content of which is incorporated herein by reference.

TECHNICAL FIELD

The present disclosure relates to a technical field of mobile phones, more particularly to a mobile phone and a slave machine.

BACKGROUND

A trend of lightweight and thin mobile phones such as smart phones is becoming more and more obvious, and demands of consumers on performance of smart phones are also gradually increasing, but the lightweight and thinning development and the performance are mutually restricted to some extent, which makes design of traditional mobile phones encounter bottlenecks.

SUMMARY

Embodiments of the present disclosure provide a mobile phone. The mobile phone includes a master machine and a slave machine. The master machine includes a first power source unit and is configured to communicate with an external apparatus. The slave machine is capable of being detachably mounted to the master machine, and the master machine is able to be in communication connection with the slave machine when the slave machine is detached from the master machine. The slave machine includes a display screen, a main board, a fingerprint identification assembly and a second power source unit. The second power source unit is capable of supplying power to the display screen, the main board and the fingerprint identification assembly. The fingerprint identification assembly includes a connecting circuit board and an identification unit, the identification unit is able to be in communication connection with the main board through the connecting circuit board. The main board is provided with a first through hole, and the identification unit is inserted into the first through hole.

Embodiments of the present disclosure further provide another mobile phone. The mobile phone includes a master machine and a slave machine. The master machine includes a first power source unit and is configured to communicate with a base station. The slave machine is capable of being detachably mounted to the master machine, and the master machine is able to be in communication connection with the slave machine when the slave machine is detached from the master machine. The slave machine includes a main board, a display screen, and a second power source unit. The display screen includes a screen unit and a screen circuit board, the screen unit is able to be in communication connection with the main board through the screen circuit board. The second power source unit is capable of supplying power to the display screen and the main board. The main board covers the screen circuit board.

Embodiments of the present disclosure further provide a slave machine. The slave machine includes a power source unit, a display screen, a main board and a fingerprint identification assembly. The power source unit being capable of supplying power to the display screen, the main board and the fingerprint identification assembly; the main board being provided with a first through hole, the fingerprint identification assembly including a connecting circuit board and an identification unit, the identification unit being able to be in communication connection with the main board through the connecting circuit board, the identification unit being inserted into the first through hole.

BRIEF DESCRIPTION OF DRAWINGS

In order to more clearly illustrate the embodiments of the present application or the technical solutions in the related art, the drawings to be used in the descriptions of the embodiments or the related art will be briefly introduced below. Obviously, the drawings described below only illustrate some embodiments of the present application, and other drawings can be obtained according to these drawings without any creative effort for those skilled in the art.

DETAILED DESCRIPTION

Figure 1:
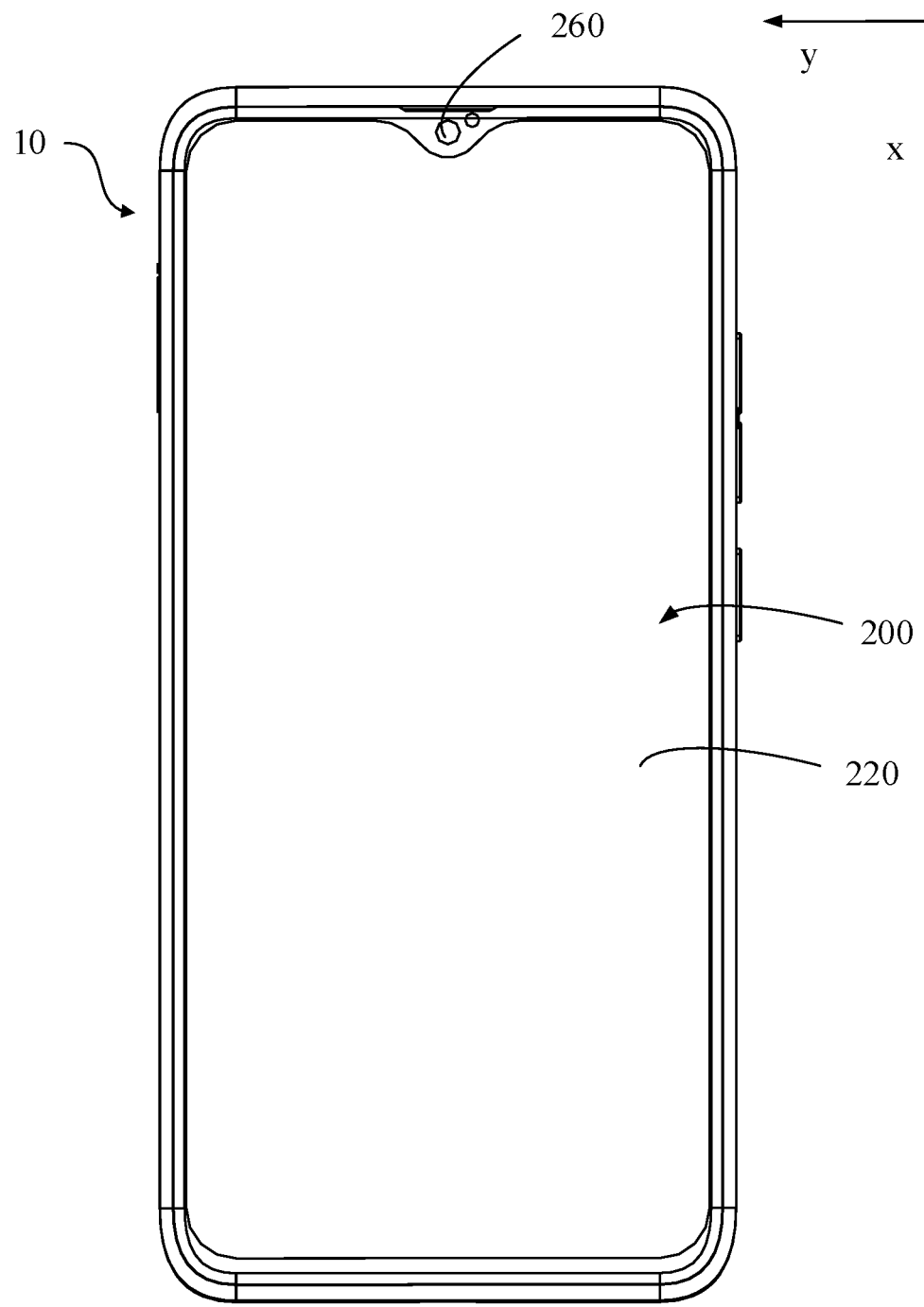
FIG. 1 is a front view of a mobile phone in an embodiment.

In order to facilitate the understanding of the present application, the present application will be described more fully hereinafter with reference to the accompanying drawings. Preferred embodiments of the present application are given in the accompanying drawings. However, the present application can be embodied in many different forms and is not limited to the embodiments described herein. Rather, these embodiments are provided so that the understanding of the disclosure of the present application is more thorough and comprehensive.

The present disclosure relates to a mobile phone. The master machine includes a first power source unit and is configured to communicate with an external apparatus. The slave machine is capable of being detachably mounted to the master machine, and the master machine is able to be in communication connection with the slave machine when the slave machine is detached from the master machine. The slave machine includes a display screen, a main board, a fingerprint identification assembly and a second power source unit. The second power source unit is capable of supplying power to the display screen, the main board and the fingerprint identification assembly. The fingerprint identification assembly includes a connecting circuit board and an identification unit, the identification unit is able to be in communication connection with the main board through the connecting circuit board. The main board is provided with a first through hole, and the identification unit is inserted into the first through hole.

In at least one embodiment, the master machine includes a wireless modem unit, a master-machine master controller, and a master-machine wireless transceiver unit; the slave machine includes a slave-machine keyboard, a slave-machine master controller, and a slave-machine wireless transceiver unit; in a first working state of the mobile phone, a control command output by the slave-machine keyboard is modulated by the slave-machine wireless transceiver unit and sent to the master-machine wireless transceiver unit under control of the slave-machine master controller, and is modulated by the wireless modem unit and sent to the air under control of the master-machine master controller; a control signal from the air is demodulated by the wireless modem unit, modulated by the master-machine wireless transceiver unit after passing the master-machine master controller, and sent to the slave machine; after received by the slave-machine wireless transceiver unit, the control signal is displayed by the display screen under the control of the slave-machine master controller.

In at least one embodiment, the master machine includes a wireless modem unit, a master-machine master controller, and a master-machine wireless transceiver unit; the slave machine includes a slave-machine master controller, a slave-machine microphone, a slave-machine receiver, a slave-machine audio coder, a slave-machine audio decoder, and a slave-machine wireless transceiver unit communicable with the master-machine wireless transceiver unit; in a second working state, an audio signal from the slave-machine microphone is coded by the slave-machine audio coder and transmitted to the slave-machine master controller, and is sent out by the slave-machine wireless transceiver unit under the control of the slave-machine master controller; after received by the master-machine wireless transceiver unit and under the control of the master-machine master controller, the audio signal is transmitted to the wireless modem unit and sent to the air after modulated by the wireless modem unit; a signal from the air is demodulated by the wireless modem unit and sent to the master-machine master controller, under the control of the master-machine master controller, the signal is transmitted to the master-machine wireless transceiver unit and sent to the slave-machine after modulated by the master-machine wireless transceiver; under the control of the slave-machine master controller, a demodulated audio signal by the slave-machine wireless transceiver unit is decoded by the slave-machine audio decoder and output by the slave-machine receiver.

In at least one embodiment, the master machine includes a wireless modem unit, a master-machine wireless transceiver unit, and a master-machine master controller communicable with the wireless modem unit and the master-machine wireless transceiver unit; the slave machine includes a slave-machine wireless transceiver unit communicable with the master-machine wireless transceiver unit and a slave-machine master controller communicable with the slave-machine wireless transceiver unit; and the slave machine is configured to be accessible to a communication network through the master machine.

In at least one embodiment, the master machine includes a first master-machine wireless communication unit, a second master-machine wireless communication unit and a master-machine master controller communicable with the first master-machine wireless communication unit and the second master-machine wireless communication unit; the slave machine includes a slave-machine wireless communication unit communicable with the first master-machine wireless communication unit and a slave-machine master controller communicable with the slave-machine wireless communication unit; and the second master-machine wireless communication unit is configured to be communicable with a base station.

In at least one embodiment, the display screen includes a screen unit and a screen circuit board, the screen unit is able to be in communication connection with the main board through the screen circuit board, the main board covers the screen circuit board.

In at least one embodiment, the slave machine includes a front face and a rear face opposite each other, and a side circumferential face connected between the front face and the rear face; a display area of the screen unit faces the front face; the master machine includes a main portion and a bracket connected with the main portion; the main portion is provided with an accommodating groove, and the bracket is able to turn over to a snap-fitted state in which the bracket is accommodated in the accommodating groove, and an unfolded state in which slave machine is arranged on the master machine vertically or obliquely, the bracket is in contact with the rear face, and the main portion is in contact with the side circumferential face.

The present disclosure further relates to another mobile phone. The mobile phone includes a master machine and a slave machine. The master machine includes a first power source unit and is configured to communicate with a base station. The slave machine is capable of being detachably mounted to the master machine, and the master machine is able to be in communication connection with the slave machine when the slave machine is detached from the master machine. The slave machine includes a main board, a display screen, and a second power source unit. The display screen includes a screen unit and a screen circuit board, the screen unit is able to be in communication connection with the main board through the screen circuit board. The second power source unit is capable of supplying power to the display screen and the main board. The main board covers the screen circuit board.

In at least one embodiment, the slave machine includes a secondary board, the secondary board and the main board are spaced apart, and the second power source unit is located between the main board and the secondary board; an area of the main board is greater than an area of the secondary board, and the secondary board is able to be in communication connection with the main board.

In at least one embodiment, a maximum thickness of the slave machine is less than or equal to 5 mm.

The present disclosure further relates to a slave machine for a mobile phone. The slave machine includes a display screen; a main board provided with a first through hole; a fingerprint identification assembly including a connecting circuit board and an identification unit; and a power source unit capable of supplying power to the display screen, the main board and the fingerprint identification assembly. The identification unit is able to be in communication connection with the main board through the connecting circuit board, and the identification unit is inserted into the first through hole.

In at least one embodiment, the display screen includes a screen unit and a screen circuit board, the screen unit is able to be in communication connection with the main board through the screen circuit board, the main board covers the screen circuit board.

In at least one embodiment, the screen circuit board is provided with a protruding portion protruding from a side facing away from a display area of the screen unit, an orthographic projection of the protruding portion on a reference plane is located outside an orthographic projection of the power source unit on the reference plane, and the reference plane is a geometric plane perpendicular to a thickness direction of the slave machine.

In at least one embodiment, the orthographic projection of the protruding portion on the reference plane is completely located within an orthographic projection of the main board on the reference plane, and the orthographic projection of the main board on the reference plane is located outside the orthographic projection of the power source unit on the reference plane.

In at least one embodiment, the orthographic projection of the power source unit on the reference plane is located outside an orthographic projection of the screen circuit board.

In at least one embodiment, the display screen includes a screen chip, the screen chip protrudes from a side facing away from the display area of the screen unit, and the screen unit is able to be in communication connection with the screen chip through the screen circuit board, the screen chip is able to be in communication connection with the main board through the screen circuit board, the main board is provided with a second through hole, and the screen chip is completely or partially accommodated in the second through hole.

In at least one embodiment, the slave machine includes a secondary board, the secondary board and the main board are spaced apart, and the second power source unit is located between the main board and the secondary board; an area of the main board is greater than an area of the secondary board, and the secondary board is able to be in communication connection with the main board.

In at least one embodiment, the slave machine includes a camera unit, the camera unit is connected with the secondary board and communicable with the secondary board, the screen unit is provided with a notch, and the camera unit is inserted into the notch.

In at least one embodiment, a light incident face of the camera unit is exposed out of the display area of the screen unit so as to enable the camera unit to implement the function of a front-facing camera.

In at least one embodiment, the main board includes a circuit board and a plurality of electronic elements, the plurality of electronic elements are connected with the circuit board separately, and the electronic elements are located at a side of the circuit board facing away from the screen unit.

Figure 2:
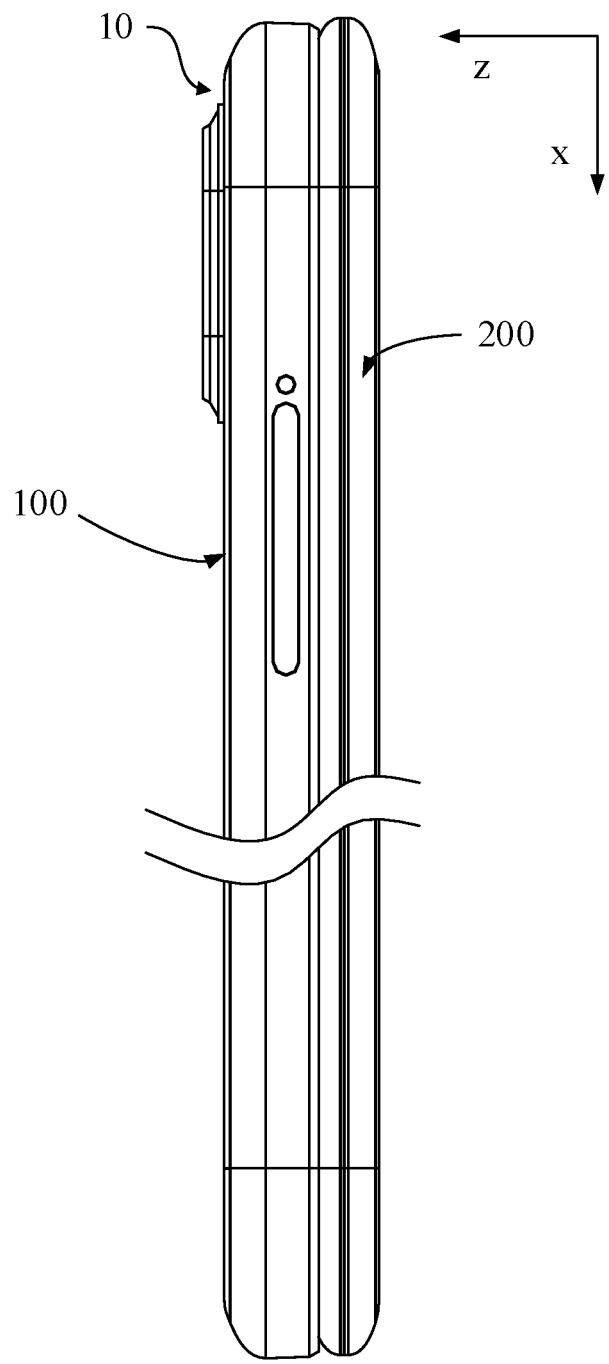
FIG. 2 is a left side view of the mobile phone illustrated in FIG. 1.
Figure 3:
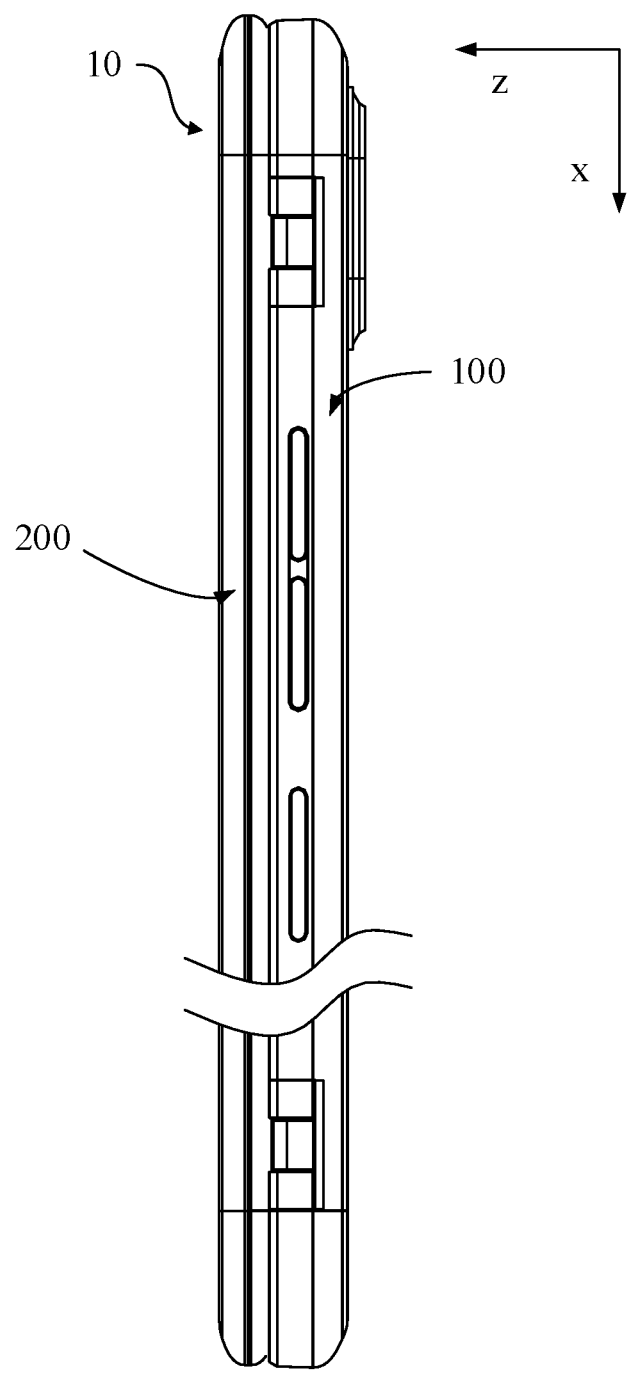
FIG. 3 is a right side view of the mobile phone illustrated in FIG. 1.
Figure 4:
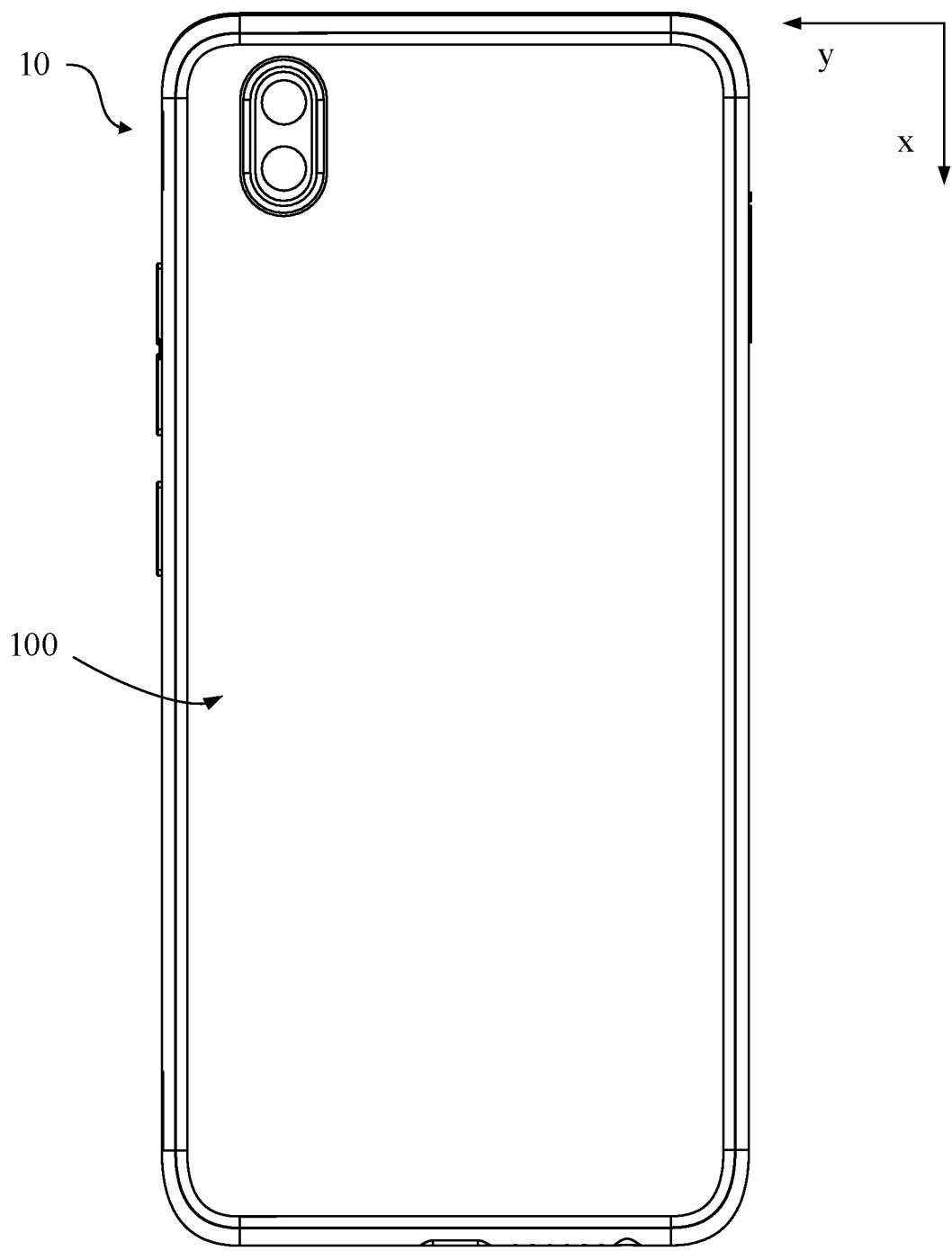
FIG. 4 is a rear view of the mobile phone illustrated in FIG. 1.
Figure 5:
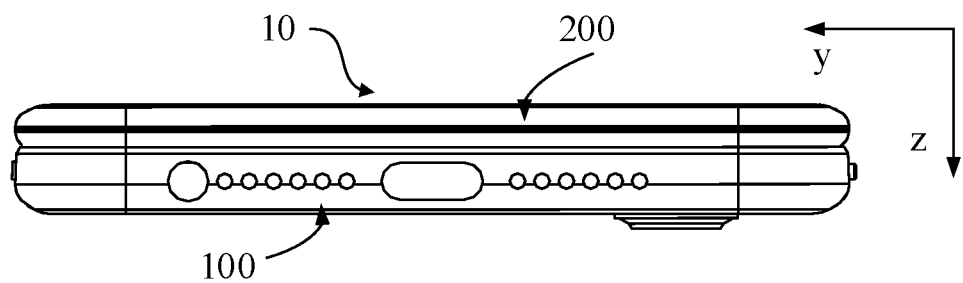
FIG. 5 is a bottom view of the mobile phone illustrated in FIG. 1.
Figure 6:
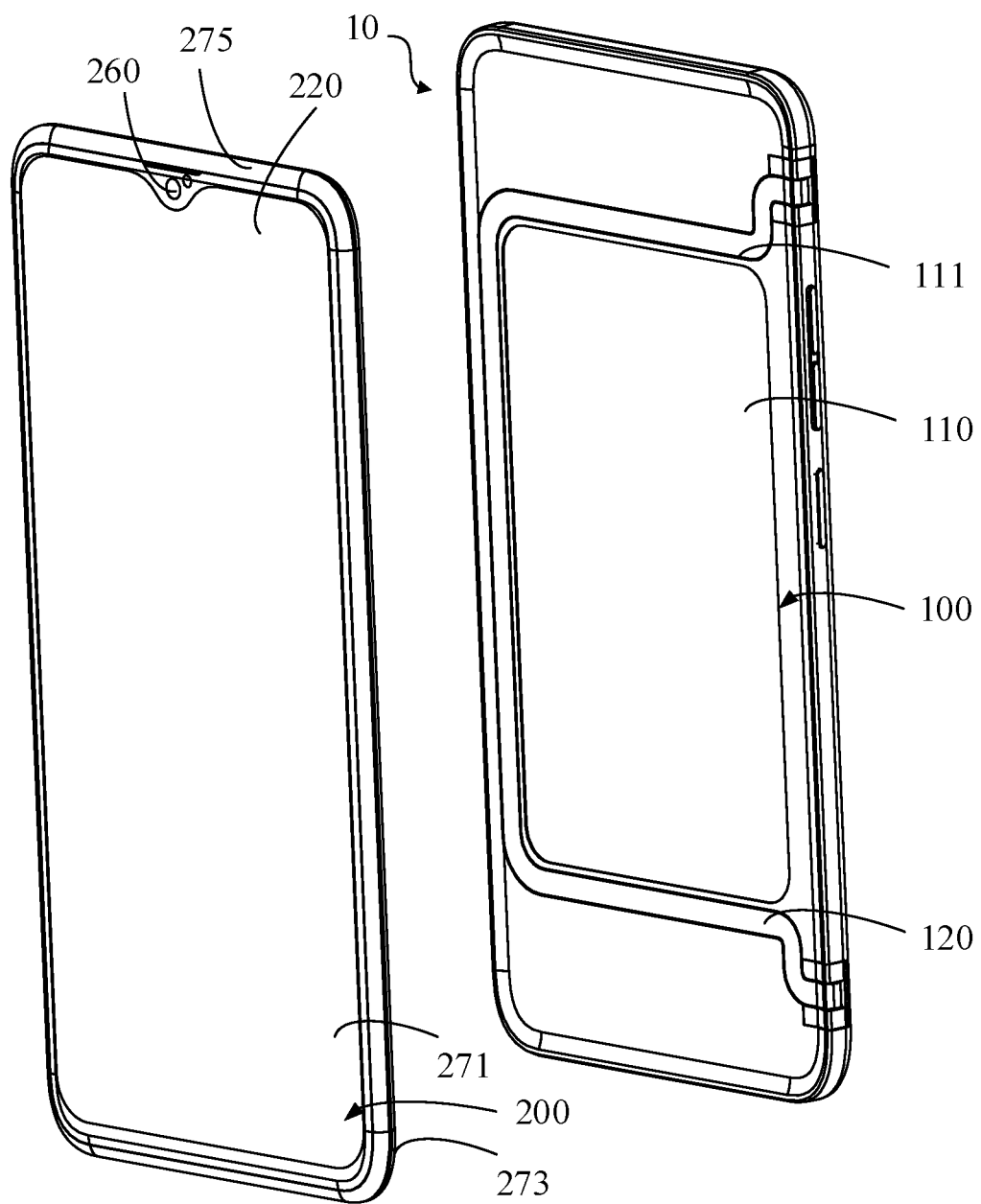
FIG. 6 is a perspective view of the mobile phone illustrated in FIG. 1 where a slave machine is detached from a master machine.

As illustrated in FIG. 1 to FIG. 3, in an embodiment, a mobile phone 10 is a smart phone. The mobile phone 10 includes a master machine 100 and a slave machine 200. As illustrated in both FIG. 4 and FIG. 5, the master machine 100 includes a first power source unit. As illustrated in both FIG. 6 and FIG. 7, the slave machine 200 includes a second power source unit 210, a display screen 220, a main board 230 and a fingerprint identification assembly 240. The second power source unit 210 can supply power to the display screen 220, the main board 230 and the fingerprint identification assembly 240. The display screen 220 can be used to display information and provide an interaction interface for a user. The fingerprint identification assembly 240 can be used in an identity recognition process. The slave machine 200 can be mounted to the master machine 100 and detached from the master machine 100. As illustrated in FIG. 6, when the slave machine 200 is detached from the master machine 100, the master machine 100 can be in communication connection with the slave machine 200. When the slave machine 200 is detached from the master machine 100, the slave machine 200 can operate independently and provide basic functions such as display, call, etc. for convenient use by the user, and the master machine 100 can be placed in a pocket or other places. Main functions such as data processing, storage, baseband communication, etc. of the mobile phone 10 can be provided by the master machine 100 so as to reduce the number of electronic components of the slave machine 200, thereby realizing the lightweight and thinning development of the slave machine 200. When the slave machine 200 is mounted to the master machine 100, the mobile phone 10 can implement complete functions. In other embodiments, the mobile phone 10 can be a tablet or the like.

Figure 8:
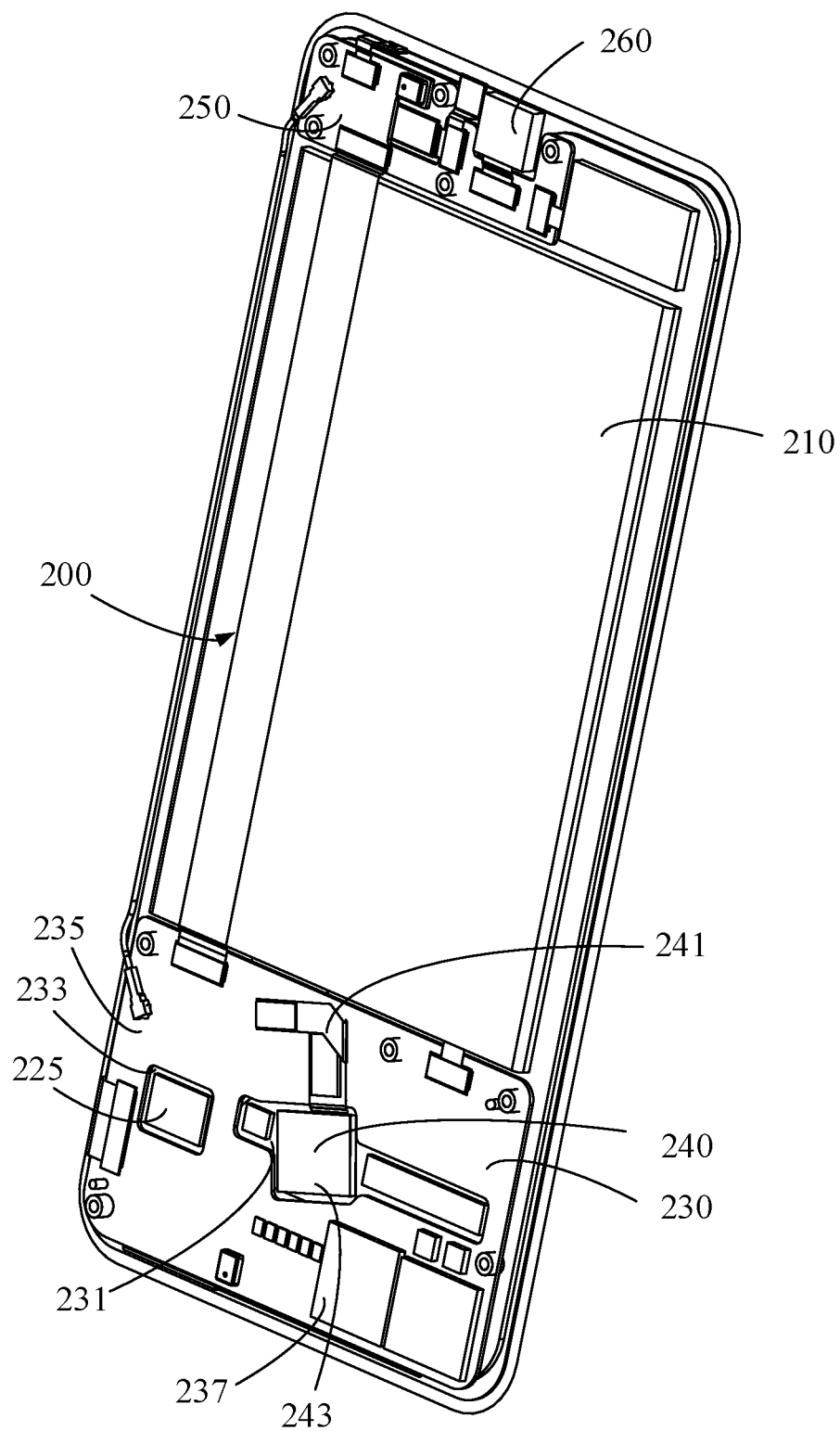
FIG. 8 is a perspective view of the slave machine of the mobile phone illustrated in FIG. 7 where some components are detached.
Figure 9:
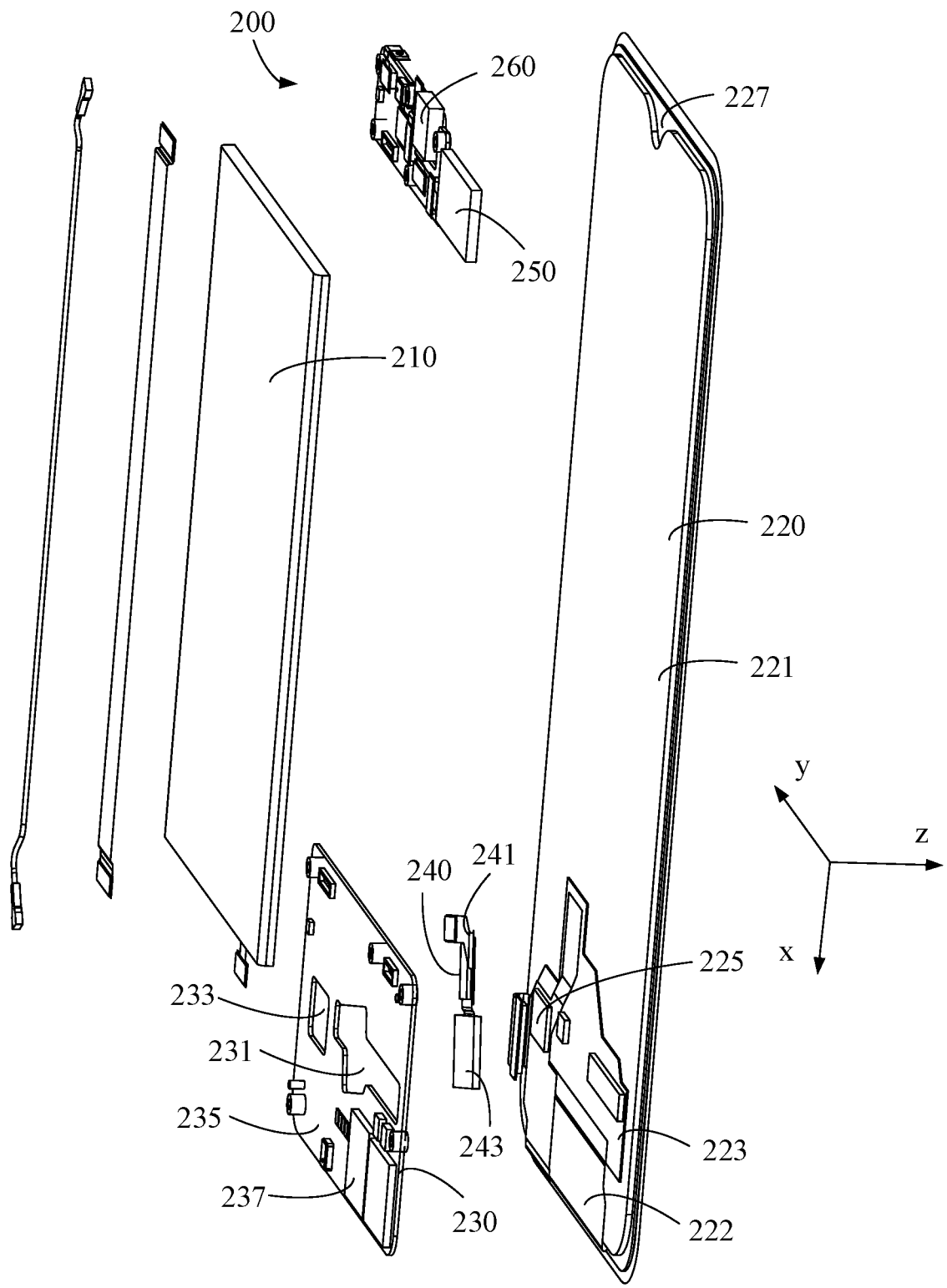
FIG. 9 is an exploded view of the slave machine of the mobile phone illustrated in FIG. 8.

As illustrated in FIG. 8 and FIG. 9, the main board 230 of the slave machine 200 is provided with a first through hole 231, and the fingerprint identification assembly 240 includes a connecting circuit board 241 and an identification unit 243. The identification unit 243 can be in communication connection with the main board 230 through the connecting circuit board 241, and inserted into the first through hole 231. Specifically, in an embodiment, the connecting circuit board 241 is a flexible circuit board (also referred to as a flexible printed circuit, i.e. FPC), two ends of the connecting circuit board 241 are connected to the main board 230 and the identification unit 243 respectively, such that the identification unit 243 can be in communication connection with the main board 230. The identification unit 243 is used to acquire fingerprint information of the user so as to enable the mobile phone 10 to verify identity of the user.

Figure 10:
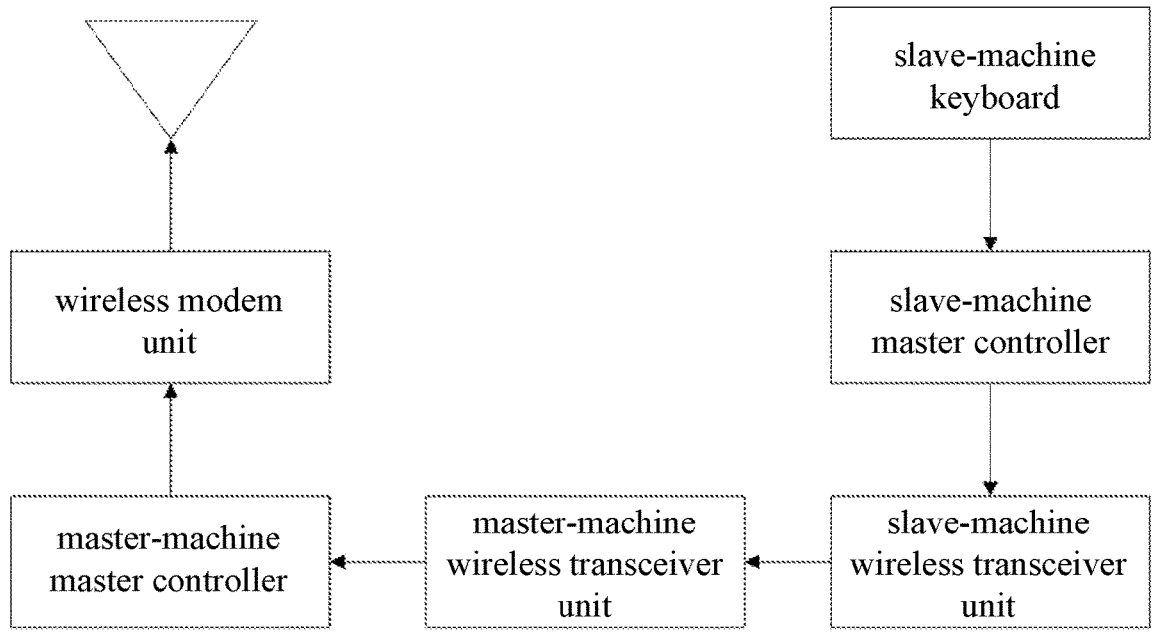
FIG. 10 is a flow chart of a mobile phone in an embodiment in a first working state.
Figure 11:
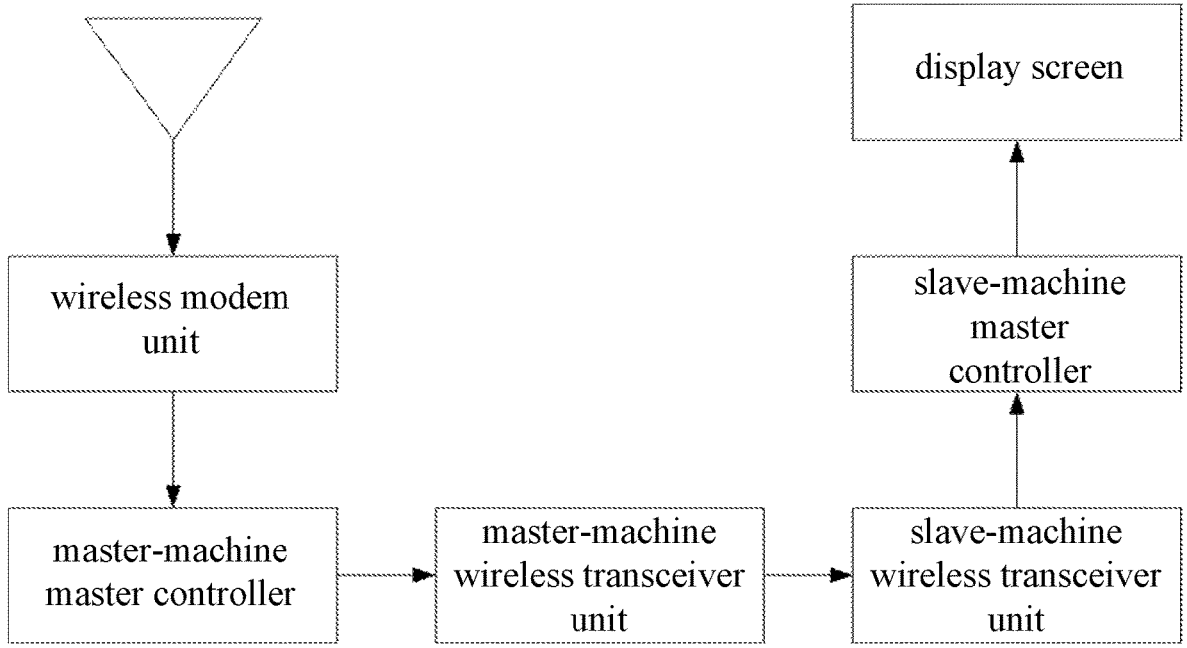
FIG. 11 is another flow chart of the mobile phone illustrated in FIG. 10 in the first working state.

As illustrated in FIG. 10 and FIG. 11, in an embodiment, the master machine 100 includes a wireless modem unit, a master-machine master controller, and a master-machine wireless transceiver unit. The slave machine 200 includes a slave-machine keyboard, a slave-machine master controller, and a slave-machine wireless transceiver unit. In a first working state of the mobile phone 10, a control command output by the slave-machine keyboard is modulated by the slave-machine wireless transceiver unit and sent to the master-machine wireless transceiver unit under control of the slave-machine master controller, and is modulated by the wireless modem unit and sent to the air under control of the master-machine master controller. A control signal from the air is demodulated by the wireless modem unit, passed through the master-machine master controller, modulated by the master-machine wireless transceiver unit and sent to the slave machine, and is displayed by the display screen 220 under the control of the slave-machine master controller after received by the slave-machine wireless transceiver unit. It could be understood that the slave-machine keyboard can be a touch keyboard, or be embodied by a display screen having a touch screen operation function.

Figure 12:
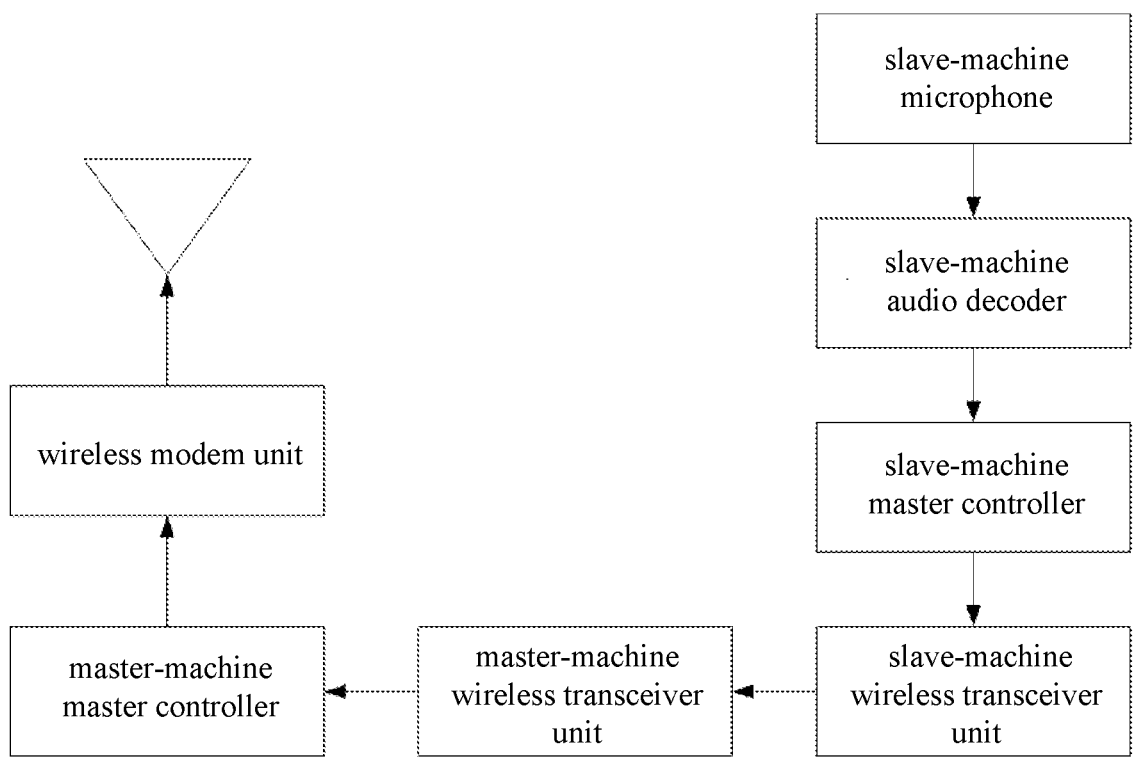
FIG. 12 is a flow chart of a mobile phone in an embodiment in a second working state.
Figure 13:
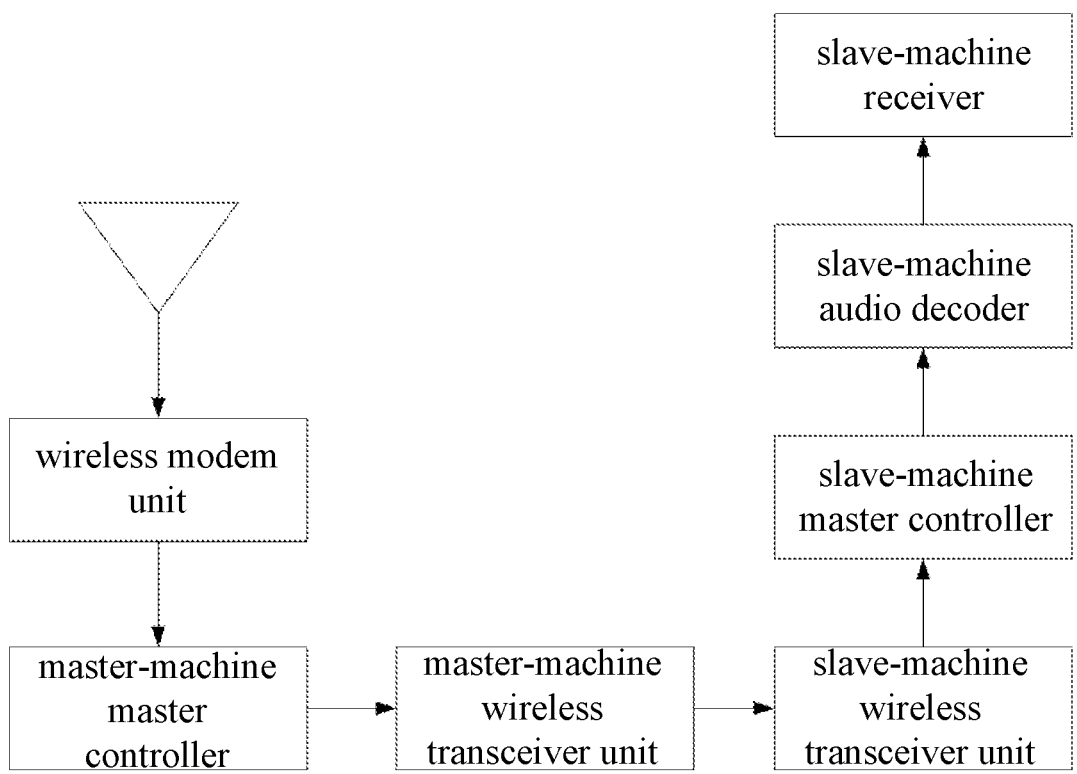
FIG. 13 is another flow chart of the mobile phone illustrated in FIG. 12 in the second working state.

As illustrated in FIG. 12 and FIG. 13, in an embodiment, the master machine 100 includes a wireless modem unit, a master-machine master controller, and a master-machine wireless transceiver unit. The slave machine 200 includes a slave-machine master controller, a slave-machine microphone, a slave-machine receiver, a slave-machine audio coder, a slave-machine audio decoder, and a slave-machine wireless transceiver unit communicable with the master-machine wireless transceiver unit. In a second working state, an audio signal from the slave-machine microphone is coded by the slave-machine audio coder and transmitted to the slave-machine master controller, and is sent out by the slave-machine wireless transceiver unit under the control of the slave-machine master controller; after received by the master-machine wireless transceiver unit and under the control of the master-machine master controller, the signal is transmitted to the wireless modem unit and sent to the air after modulated by the wireless modem unit. The signal from the air is demodulated by the wireless modem unit and sent to the master-machine master controller, under the control of the master-machine master controller, the signal is transmitted to the master-machine wireless transceiver unit and sent to the slave-machine 200 after modulated by the master-machine wireless transceiver; under the control of the slave-machine master controller, a demodulated audio signal by the slave-machine wireless transceiver unit is decoded by the slave-machine audio decoder and output by the slave-machine receiver. It could be understood that the slave-machine audio coder can be an independent hardware unit, or can be integrated into the slave-machine microphone or into the slave-machine master controller, and in terms of the function, the slave-machine audio coder can be an audio codec which also has an audio decoding function. The slave-machine audio decoder can be an independent hardware unit, or can be integrated into the slave-machine receiver or into the slave-machine master controller, and in terms of the function, the slave-machine audio decoder can be an audio codec which also has an audio coding function.

Figure 14:
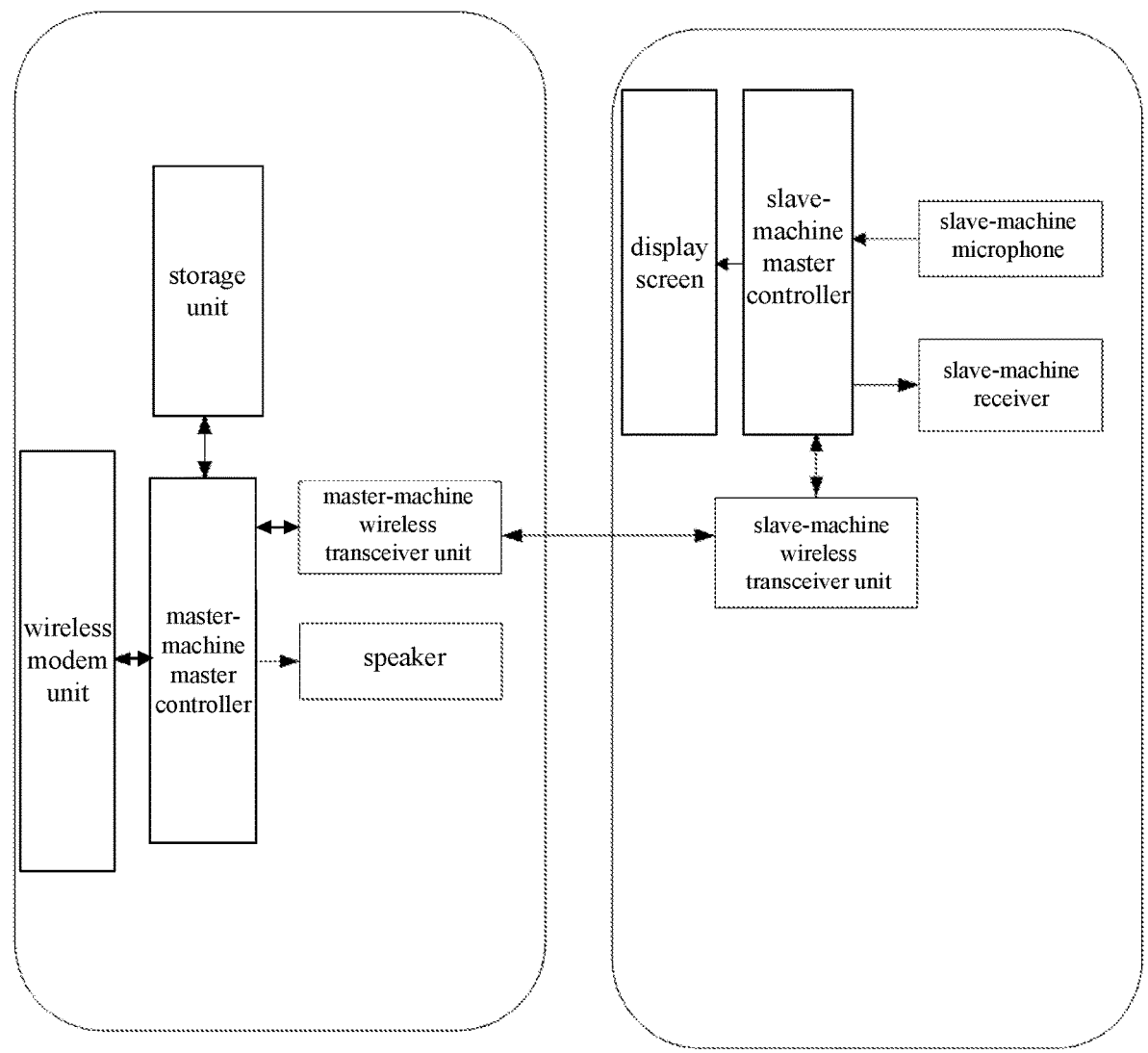
FIG. 14 is a schematic view of a unit structure of a mobile phone in an embodiment.
Figure 15:
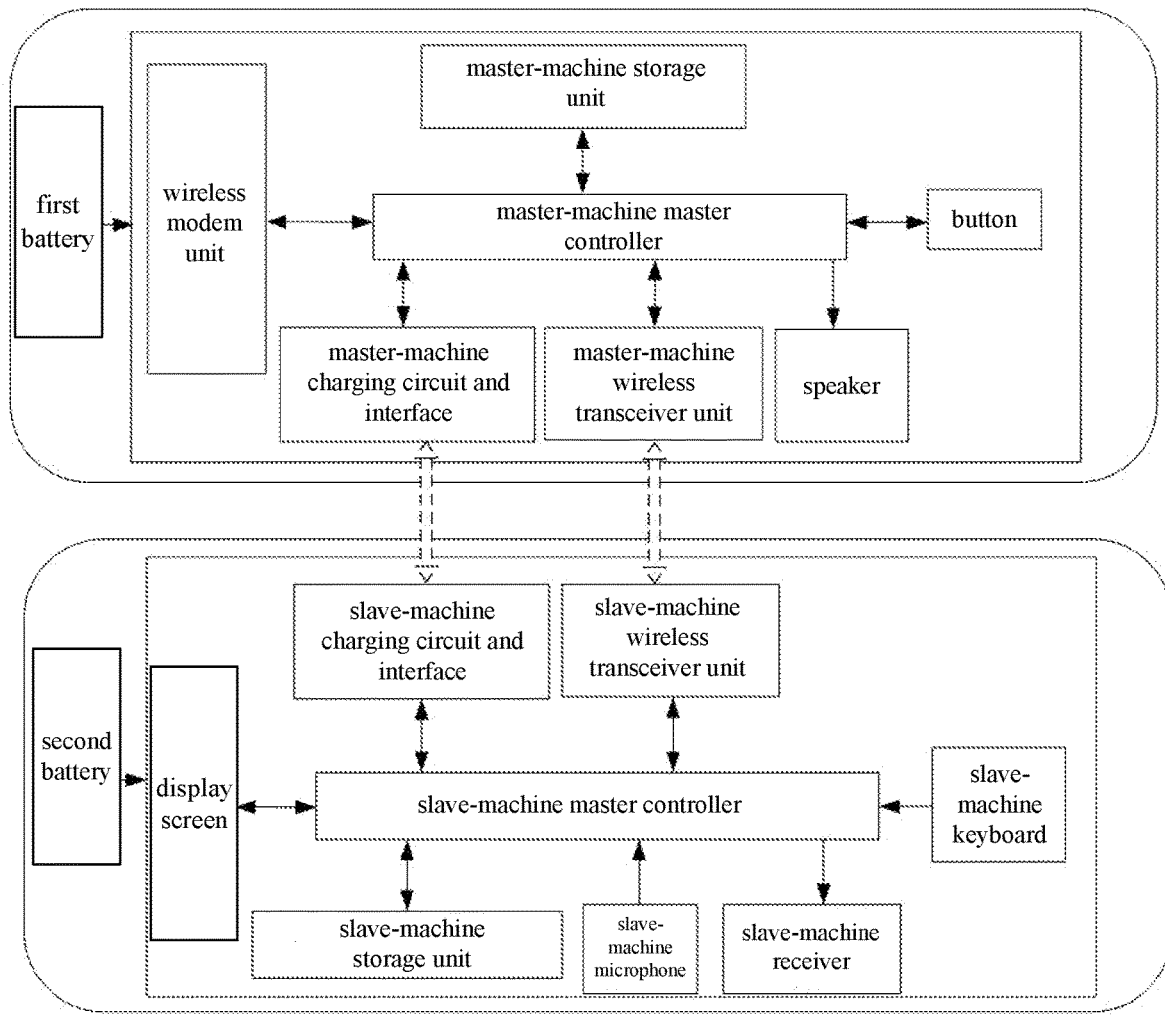
FIG. 15 is a schematic view of a unit structure of a mobile phone in another embodiment.

As illustrated in FIG. 14 and FIG. 15, in an embodiment, the master machine 100 includes a wireless modem unit, a master-machine master controller, and a master-machine wireless transceiver unit. The master-machine master controller can communicate with the wireless modem unit and the master-machine wireless transceiver unit. The slave machine 200 includes a slave-machine master controller, and a slave-machine wireless transceiver unit communicable with the master-machine wireless transceiver unit. The slave-machine master controller can communicate with the slave-machine wireless transceiver unit. The slave machine 200 can be accessible to a communication network through the master machine 100.

Figure 16:
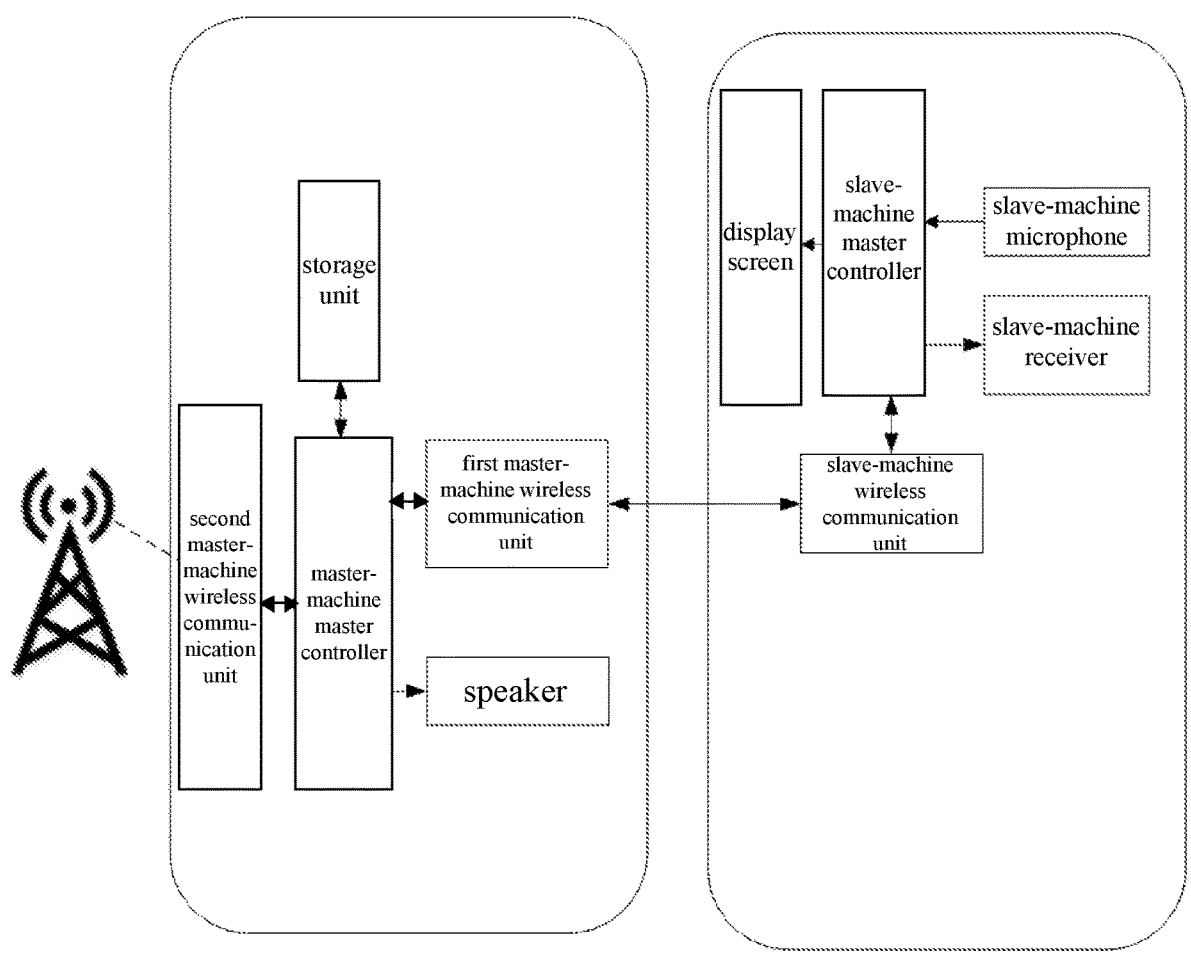
FIG. 16 is a schematic view of a unit structure of a mobile phone in yet another embodiment.

Further, as illustrated in FIG. 16, the master machine 100 includes a first master-machine wireless communication unit, a master-machine master controller and a second master-machine wireless communication unit. The master-machine master controller is communicable with the first master-machine wireless communication unit and the second master-machine wireless communication unit. The slave machine 200 includes a slave-machine master controller and a slave-machine wireless communication unit. The slave-machine master controller is communicable with the slave-machine wireless communication unit. The slave-machine wireless communication unit is communicable with the first master-machine wireless communication unit, and the second master-machine wireless communication unit is communicable with a base station. In an embodiment, the first master-machine wireless communication unit and the slave-machine wireless communication unit are both a low power Bluetooth communication unit. In other embodiments, the first master-machine wireless communication unit and the slave-machine wireless communication unit can both be a wireless local area network (or a wireless fidelity, WiFi) communication unit.

In the above-mentioned the mobile phone 10, the main board 230 is provided with the first through hole 231, and the identification unit 243 of the fingerprint identification assembly 240 is inserted into the first through hole 231, this configuration avoids overlapping of the identification unit 243 of the fingerprint identification assembly 240 and the main board 230, which facilitates the reduction of the overall thickness of the slave machine 200, and is advantageous for the lightweight and thinning development of the slave machine 200 and hence advantageous for the lightweight and thinning development of the mobile phone 10.

In an embodiment, the fingerprint identification assembly 240 adopts an in-screen fingerprint solution, that is, the display screen 220 adopts an organic light-emitting diode (OLED) screen, and the display screen 220 can be covered on the fingerprint identification assembly 240 by utilizing transparent characteristics of the OLED screen itself, which realizes the in-screen fingerprint identification, so as to avoid an opening in the display screen 220, hence avoid adversely affecting the screen-to-body ratio and appearance of the slave machine 200.

As illustrated in FIG. 9, in an embodiment, the display screen 220 includes a screen unit 221 and a screen circuit board 223. The screen unit 221 can be in communication connection with the main board 230 through the screen circuit board 223, and the main board 230 covers the screen circuit board 223. The screen circuit board 223 is provided with a protruding portion 222 protruding from a side facing away from a display area of the screen unit 221. Specifically, in an embodiment, a flexible circuit board of the screen unit 221 forms into a fold-over shape and protrudes from the side facing away from the display area of the screen unit 221, and the protruding portion 222 is a part of the flexible circuit board. In an embodiment, a coordinate system is established by picking a length direction of the slave machine 200 as an X axis, a width direction of the slave machine 200 as a Y axis, and a thickness direction of the slave machine 200 as a Z axis, a geometric plane perpendicular to the thickness direction (Z axis direction) of the slave machine 200 is established and serves as a reference plane, then an orthographic projection of the protruding portion 222 on the reference plane is located outside an orthographic projection of the second power source unit 210 on the reference plane. The above-mentioned configuration avoids overlapping of the second power source unit 210 and the protruding portion 222 of the screen circuit board 223, and the second power source unit 210 can have a suitably greater thickness. As a thickness parameter of the second power source unit 210 has greater influence on a battery capacity than length and width parameters of the second power source unit 210, the above-mentioned configuration facilitates the lightweight and thinning development of the slave machine 200 and hence the lightweight and thinning development of the mobile phone 10, while improving the battery endurance of the slave machine 200. For example, the greatest thickness of the slave machine 200 adopting the above-mentioned configuration can be less than or equal to 5 mm.

Further, in an embodiment, the orthographic projection of the protruding portion 222 on the reference plane is completely located within an orthographic projection of the main board 230 on the reference plane, and the orthographic projection of the main board 230 on the reference plane is located outside the orthographic projection of the second power source unit 210 on the reference plane. The above-mentioned configuration avoids overlapping of the second power source unit 210 and the main board 230, the second power source unit 210 can have a suitably greater thickness, which guarantees the lightweight and thinning development of the slave machine 200 and hence facilitates the lightweight and thinning development of the mobile phone 10, while improving the battery endurance of the slave machine 200. Further, in an embodiment, the orthographic projection of the second power source unit 210 on the reference plane is located outside the orthographic projection of the screen circuit board 223 on the reference plane. The above-mentioned configuration avoids overlapping of the second power source unit 210 and the screen circuit board 223, the second power source unit 210 can have a suitably greater thickness, which guarantees the lightweight and thinning development of the slave machine 200 and hence facilitates the lightweight and thinning development of the mobile phone 10, while improving the battery endurance of the slave machine 200.

Further, the display screen 220 includes a screen chip 225 configured to drive the screen unit 221 so as to control the display of the screen unit 221. The screen chip 225 protrudes from the side facing away from the display area of the screen unit 221, and the screen unit 221 can be in communication connection with the screen chip 225 through the screen circuit board 223. The screen chip 225 can be in communication connection with the main board 230 through the screen circuit board 223 so that the main board 230 can control the display of the screen unit 221. It could be understood that the screen chip 225 is provided with a circuit configured to control the screen unit 221 and other necessary electronic components. The main board 230 is provided with a second through hole 233, and the screen chip 225 is completely or partially accommodated in the second through hole 233. The above-mentioned structure avoids overlapping of the screen chip 225 and the main board 230, facilitates the reduction of the overall thickness of the slave machine 200, and hence facilitates the lightweight and thinning development of the slave machine 200.

In an embodiment, the main board 230 includes a circuit board 235 and a plurality of electronic elements 237. The plurality of electronic elements 237 are connected with the circuit board 235 separately, and all of the electronic elements 237 are located at a side of the circuit board 235 facing away from the screen unit 221. Specifically, the electronic element 237 can include a processor, a power management chip, a baseband chip, a storage chip and other electronic components such as a capacitor or a resistance for the slave machine 200. In the thickness direction (Z axis direction) of the slave machine 200, the above-mentioned configuration avoids arranging the electronic elements 237 at two sides of the circuit board 235, so as to facilitate the reduction of the thickness of the main board 230, thereby facilitating the lightweight and thinning development of the slave machine 200.

Figure 7:
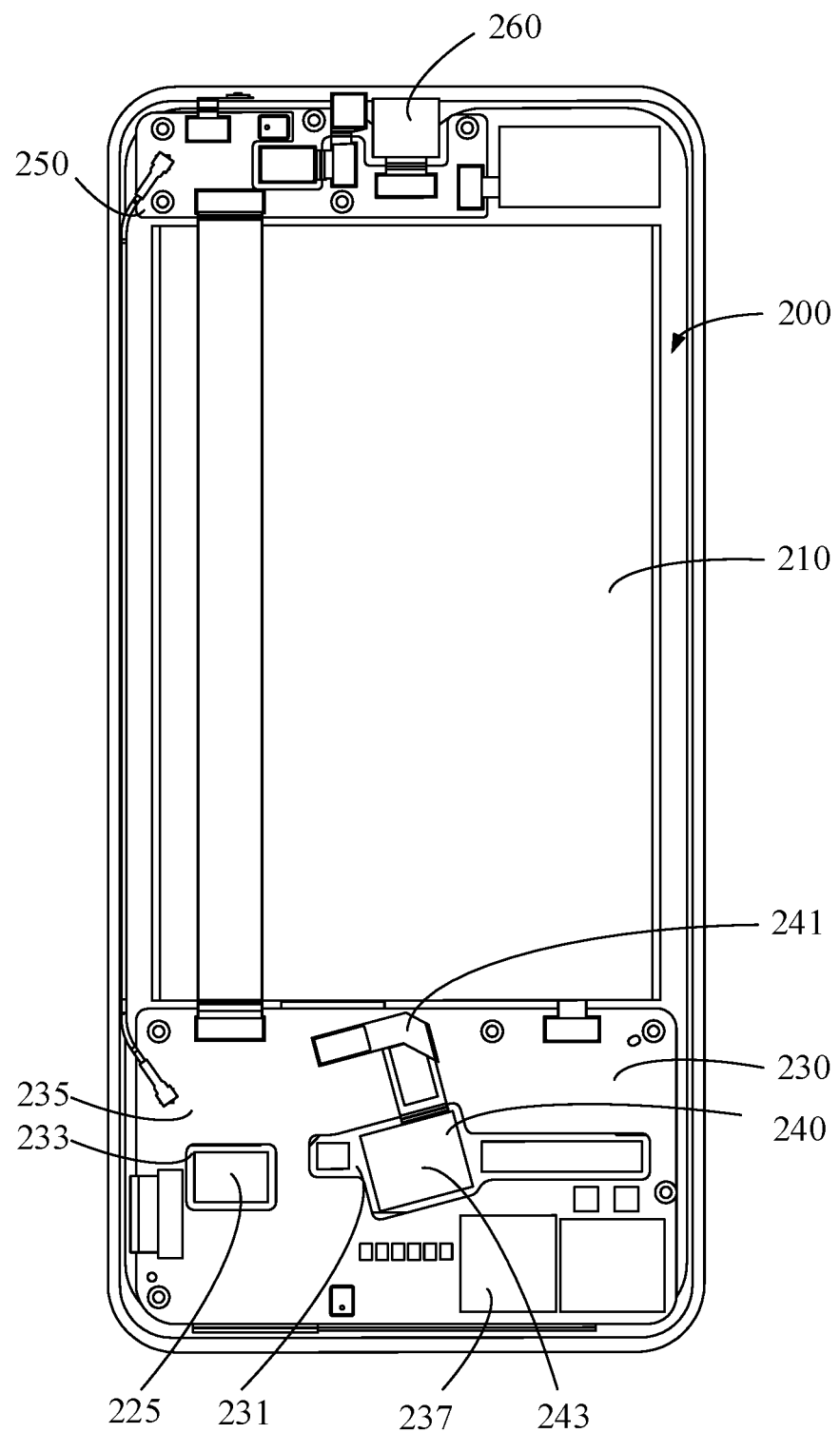
FIG. 7 is a rear view of the slave machine of the mobile phone illustrated in FIG. 6 where some components are detached.

As illustrated in FIG. 7 to FIG. 9, the slave machine 200 includes a secondary board 250, and an area of an orthographic projection of the secondary board 250 on the reference place is not greater than an area of the orthographic projection of the main board 230 on the reference plane. A greater number of electronic components can be arranged on the main board 230, for example, the slave-machine master controller, the power management unit, the slave-machine storage unit and the like of the slave machine 200 can be arranged on the main board 230. The number of the electronic component on the secondary board 250 can be less than that on the main board 230. The second power source unit 210 can supply power to the secondary board 250 and the secondary board 250 can be in communication connection with the main board 230. Specifically, in an embodiment, the communication between the main board 230 and the secondary board 250 as well as power supply from the second power source unit 210 to the secondary board 250 are both implemented by the flexible circuit board. In the length direction (X axis direction) of the slave machine 200, the main board 230 and the secondary board 250 are spaced apart, and the second power source unit 210 is located between the main board 230 and the secondary board 250. With the above-mentioned configuration, it is needless to overlap the second power source unit 210 on the main board 230 or the secondary board 250, the second power source unit 210 can have a suitably greater thickness so as to improve the battery endurance of the slave machine 200 while guaranteeing the lightweight and thinning development of the slave machine 200. It could be understood that the arrangement of the electronic elements of the secondary board 250 can be similar to that of the main board 230, that is, all of the electronic elements of the secondary board 250 are arranged at the side facing away from the display area of the screen unit 221, which facilitates the reduction of the thickness of the secondary board 250, and hence facilitate the reduction of the overall thickness of the slave machine 200.

As illustrated in FIG. 6 to FIG. 8, in an embodiment, the slave machine 200 includes a camera unit 260, and the camera unit 260 is connected with the secondary board 250 and communicable with the secondary board 250. As illustrated in FIG. 9, the screen unit 221 is provided with a notch 227, and the camera unit 260 is inserted into the notch 227. A light incident face of the camera unit 260 can be exposed out of the display area of the screen unit 221 so as to enable the camera unit 260 to implement the function of a front-facing camera, which makes it convenient for the user to perform operations such as video conversation and self-photographing through the front-facing camera. The configuration of the camera unit 260 being inserted into the notch 227 is not only advantageous for improving the screen-to-body ratio of the slave machine 200, but also able to avoid overlapping of the screen unit 221 and the camera unit 260, thereby facilitating the lightweight and thinning development of the slave machine 200.

Further, the slave machine 200 can include a functional component. The functional component is connected with the secondary board 250 and communicable with the secondary board 250. The functional component includes at least one of a microphone, a receiver, an ambient light sensor, a proximity sensor and a fill light. The microphone is used to receive external sound signal, and the receiver is used to transmit the sound signal to the outside of the slave machine 200 to make it convenient for the user to talk or receive voice information. The ambient light sensor is used to detect intensity of the ambient light, so that the slave machine 200 can adjust display brightness of the screen unit 221 according to the intensity of the ambient light, so that the user can view information through the screen unit 221. The proximity sensor is used to detect a distance between the user's face and the slave machine 200, so that the display screen 220 can automatically turn off or on the screen when the user answers a call. The fill light can be an LED light. During a photographing process of the camera unit 260, light can be supplemented by the fill light to improve photographing quality of the camera unit 260.

As illustrated in FIG. 6, the slave machine 200 includes a front face 271 and a rear face 273 opposite each other, and a side circumferential face 275 connected between the front face 271 and the rear face 273. The display area of the screen unit 221 faces the front face 271. The master machine 100 includes a main portion 110 and a bracket 120 connected with the main portion 110. The main portion 110 is provided with an accommodating groove 111, and the bracket 120 can turn over to a snap-fitted state and an unfolded state with respect to the main portion 110. As illustrated in FIG. 6, in the snap-fitted state, the bracket 120 is accommodated in the accommodating groove 111. In the unfolded state, the slave machine 200 can be arranged on the master machine 100 vertically or obliquely, the bracket 120 can be in contact with the rear face 273, and the main portion 110 can be in contact with the side circumferential face 275. The slave machine 200 can be supported by utilizing the bracket 120 so as to make it convenient for the user to watch videos by using the slave machine 200.

The technical features of the above-described embodiments may be arbitrarily combined. For the sake of brevity of description, all possible combinations of the technical features in the above embodiments are not described. However, as long as there is no contradiction in the combinations of these technical features, all of the combination should be considered to fall within the scope of the present specification.

The above-mentioned embodiments are merely illustration of several embodiments of the present application, and the description thereof is specific and detailed, but is not to be construed as limiting the scope of the present application. It should be noted that a number of variations and modifications may be made by those skilled in the art without departing from the concept of the present application, all of which fall in the protection scope of the present application. Therefore, the protection scope of the present application should be subject to the appended claims.

What is claimed is:

1. A mobile phone, comprising:
    a master machine comprising a first power source unit and configured to communicate with an external apparatus; and
    a slave machine capable of being detachably mounted to the master machine, the master machine being able to be in communication connection with the slave machine when the slave machine is detached from the master machine, and the slave machine comprising:
        a display screen,
        a main board,
        a secondary board,
        a fingerprint identification assembly comprising a connecting circuit board and an identification unit, the identification unit being able to be in communication connection with the main board through the connecting circuit board, and
        a second power source unit capable of supplying power to the display screen, the main board and the fingerprint identification assembly,
    wherein the main board is provided with a first through hole, and the identification unit is inserted into the first through hole,
    wherein the secondary board and the main board are spaced apart, the second power source unit is located between the main board and the secondary board, an area of the main board is greater than an area of the secondary board, and the secondary board is able to be in communication connection with the main board.

2. The mobile phone according to claim 1, wherein the master machine comprises a wireless modem unit, a master-machine master controller, and a master-machine wireless transceiver unit; the slave machine comprises a slave-machine keyboard, a slave-machine master controller, and a slave-machine wireless transceiver unit;
    in a first working state of the mobile phone, a control command output by the slave-machine keyboard is modulated by the slave-machine wireless transceiver unit and sent to the master-machine wireless transceiver unit under control of the slave-machine master controller, and is modulated by the wireless modem unit and sent to the air under control of the master-machine master controller; and
    a control signal from the air is demodulated by the wireless modem unit, modulated by the master-machine wireless transceiver unit after passing the master-machine master controller, and sent to the slave machine; after received by the slave-machine wireless transceiver unit, the control signal is displayed by the display screen under the control of the slave-machine master controller.

3. The mobile phone according to claim 1, wherein the master machine comprises a wireless modem unit, a master-machine master controller, and a master-machine wireless transceiver unit; the slave machine comprises a slave-machine master controller, a slave-machine microphone, a slave-machine receiver, a slave-machine audio coder, a slave-machine audio decoder, and a slave-machine wireless transceiver unit communicable with the master-machine wireless transceiver unit;
    in a second working state, an audio signal from the slave-machine microphone is coded by the slave-machine audio coder and transmitted to the slave-machine master controller, and is sent out by the slave-machine wireless transceiver unit under the control of the slave-machine master controller; after received by the master-machine wireless transceiver unit and under the control of the master-machine master controller, the audio signal is transmitted to the wireless modem unit and sent to the air after modulated by the wireless modem unit; and
    a signal from the air is demodulated by the wireless modem unit and sent to the master-machine master controller, under the control of the master-machine master controller, the signal is transmitted to the master-machine wireless transceiver unit and sent to the slave-machine after modulated by the master-machine wireless transceiver; under the control of the slave-machine master controller, a demodulated audio signal by the slave-machine wireless transceiver unit is decoded by the slave-machine audio decoder and output by the slave-machine receiver.

4. The mobile phone according to claim 1, wherein the master machine comprises a wireless modem unit, a master-machine wireless transceiver unit, and a master-machine master controller communicable with the wireless modem unit and the master-machine wireless transceiver unit; the slave machine comprises a slave-machine wireless transceiver unit communicable with the master-machine wireless transceiver unit and a slave-machine master controller communicable with the slave-machine wireless transceiver unit; and the slave machine is configured to be accessible to a communication network through the master machine.

5. The mobile phone according to claim 1, wherein the master machine comprises a first master-machine wireless communication unit, a second master-machine wireless communication unit and a master-machine master controller communicable with the first master-machine wireless communication unit and the second master-machine wireless communication unit; the slave machine comprises a slave-machine wireless communication unit communicable with the first master-machine wireless communication unit and a slave-machine master controller communicable with the slave-machine wireless communication unit; and the second master-machine wireless communication unit is configured to be communicable with a base station.

6. The mobile phone according to claim 1, wherein the display screen comprises a screen unit and a screen circuit board, the screen unit is able to be in communication connection with the main board through the screen circuit board, and the main board covers the screen circuit board.

7. The mobile phone according to claim 6, wherein the slave machine comprises a front face and a rear face opposite each other, and a side circumferential face connected between the front face and the rear face; a display area of the screen unit faces the front face; and the master machine comprises a main portion provided with an accommodating groove and a bracket connected with the main portion; and the bracket is able to turn over to a snap-fitted state in which the bracket is accommodated in the accommodating groove, and an unfolded state in which slave machine is arranged on the master machine vertically or obliquely, the bracket is in contact with the rear face, and the main portion is in contact with the side circumferential face.

8. A slave machine for a mobile phone, comprising:
a display screen;
a main board provided with a first through hole;
a fingerprint identification assembly comprising a connecting circuit board and an identification unit, the identification unit being able to be in communication connection with the main board through the connecting circuit board, the identification unit being inserted into the first through hole;
a power source unit capable of supplying power to the display screen, the main board and the fingerprint identification assembly; and
a secondary board,
wherein the secondary board and the main board are spaced apart, the power source unit is located between the main board and the secondary board, an area of the main board is greater than an area of the secondary board, and the secondary board is able to be in communication connection with the main board.

9. The slave machine according to claim 8, wherein the display screen comprises a screen unit and a screen circuit board, the screen unit is able to be in communication connection with the main board through the screen circuit board, the main board covers the screen circuit board.

10. The slave machine according to claim 9, wherein the screen circuit board is provided with a protruding portion protruding from a side facing away from a display area of the screen unit, an orthographic projection of the protruding portion on a reference plane is located outside an orthographic projection of the power source unit on the reference plane, and the reference plane is a geometric plane perpendicular to a thickness direction of the slave machine.

11. The slave machine according to claim 10, wherein the orthographic projection of the protruding portion on the reference plane is completely located within an orthographic projection of the main board on the reference plane, and the orthographic projection of the main board on the reference plane is located outside the orthographic projection of the power source unit on the reference plane.

12. The slave machine according to claim 10, wherein the orthographic projection of the power source unit on the reference plane is located outside an orthographic projection of the screen circuit board.

13. The slave machine according to claim 9, wherein the display screen comprises a screen chip, the screen chip protrudes from a side facing away from a display area of the screen unit, and the screen unit is able to be in communication connection with the screen chip through the screen circuit board, the screen chip is able to be in communication connection with the main board through the screen circuit board, the main board is provided with a second through hole, and the screen chip is completely or partially accommodated in the second through hole.

14. The slave machine according to claim 9, wherein the main board comprises a circuit board and a plurality of electronic elements, the plurality of electronic elements are connected with the circuit board separately, and the electronic elements are located at a side of the circuit board facing away from the screen unit.

15. The slave machine according to claim 8, wherein the slave machine comprises a camera unit, the camera unit is connected with the secondary board and communicable with the secondary board, and the screen unit is provided with a notch, and the camera unit is inserted into the notch.

16. The slave machine according to claim 15, wherein a light incident face of the camera unit is exposed out of a display area of the screen unit so as to enable the camera unit to implement the function of a front-facing camera.

\* \* \* \* \*